Nov. 10, 1953 F. H. JOHNSON 2,658,523
VALVE STRUCTURE
Filed Oct. 11, 1948 3 Sheets-Sheet 3
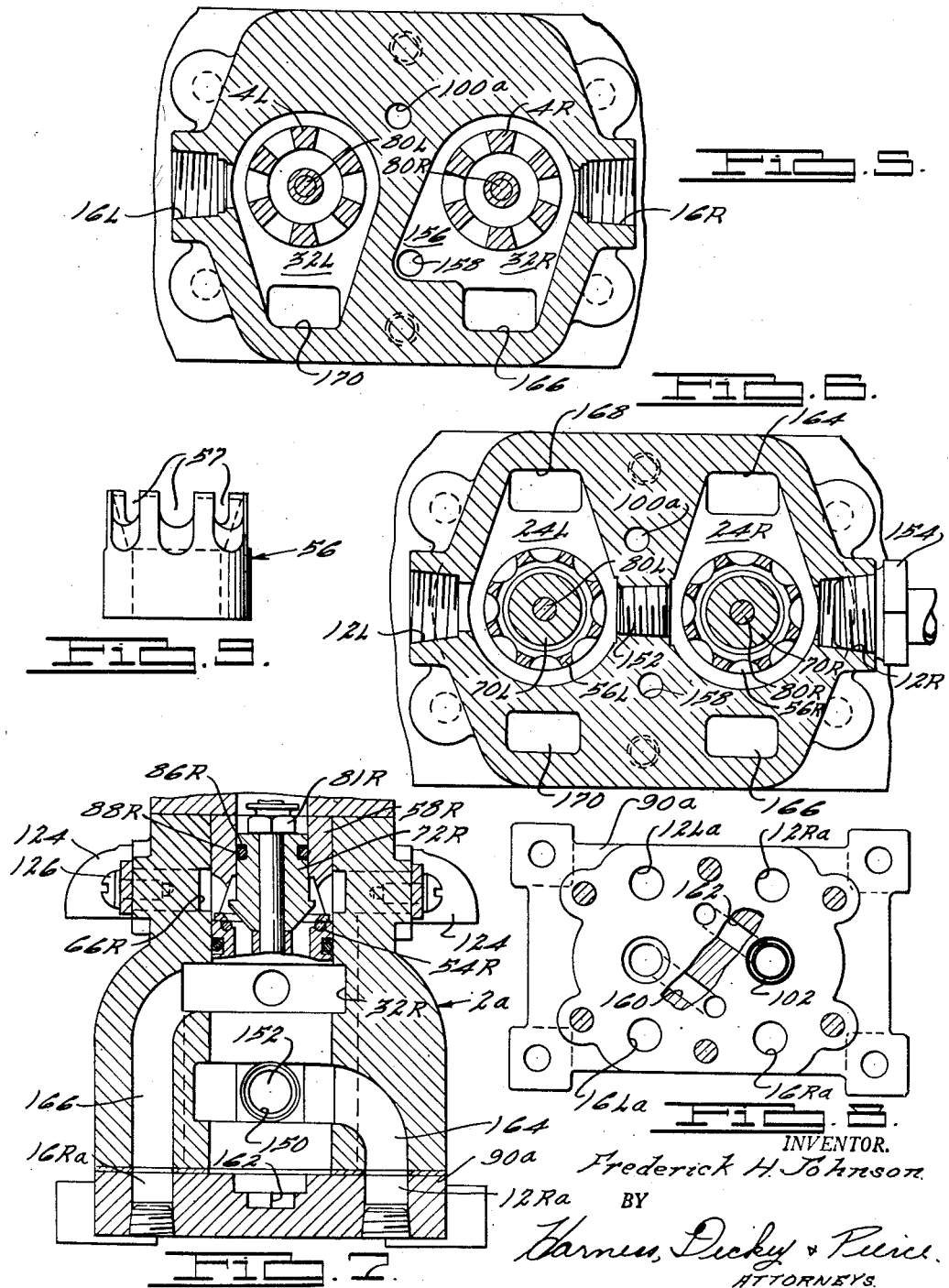
INVENTOR.
Frederick H. Johnson
BY
Harness, Dickey & Pierce.
ATTORNEYS.

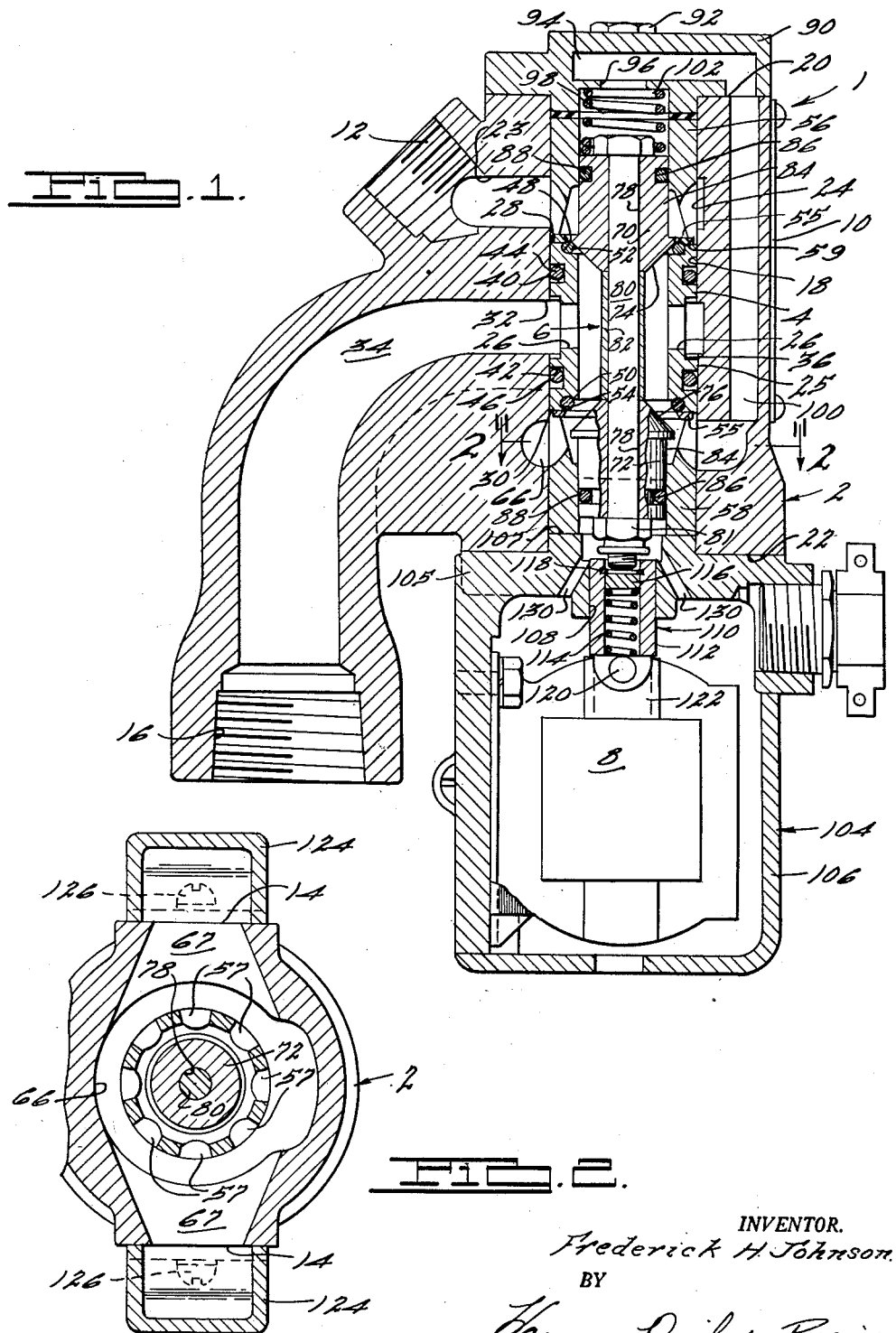

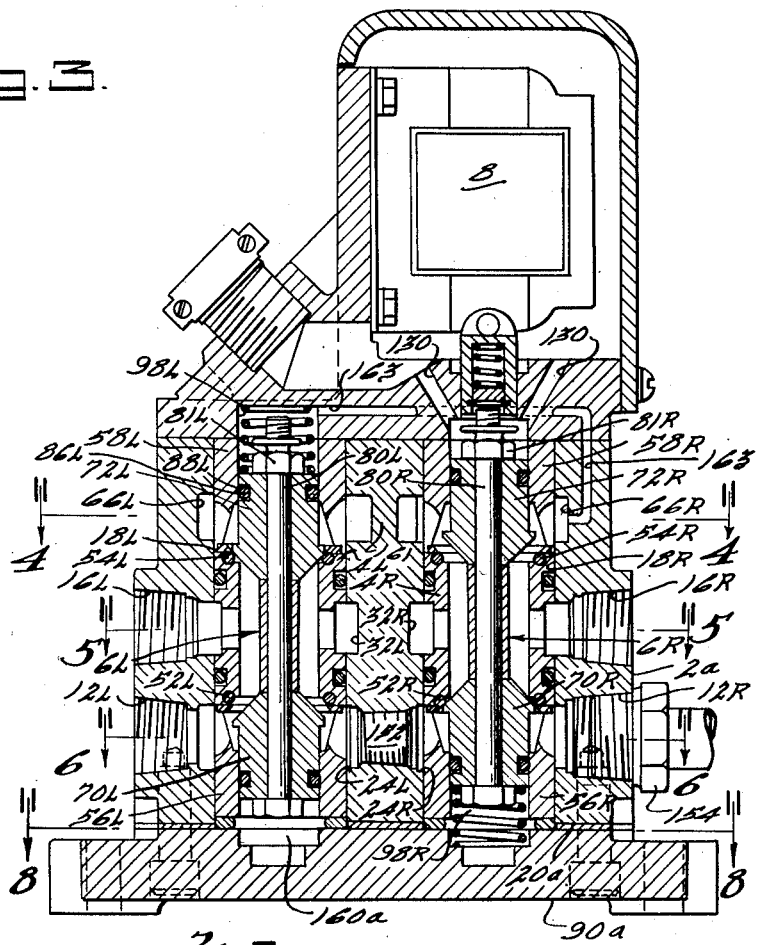
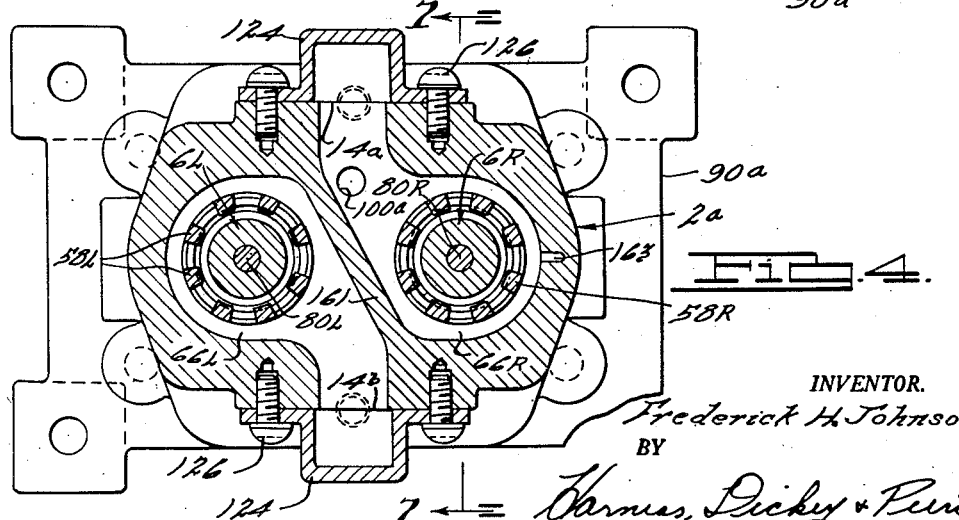
INVENTOR.
Frederick H. Johnson.
BY
Barnes, Dickey & Pierce
ATTORNEYS.

Patented Nov. 10, 1953

2,658,523

UNITED STATES PATENT OFFICE 2,658,523

VALVE STRUCTURE

Frederick H. Johnson, Pleasant Ridge, Mich.

Application October 11, 1948, Serial No. 53,861

23 Claims. (Cl. 137—623)

This invention relates generally to improved valve structures.

An object of this invention is to provide a new and improved valve structure which is simple in construction and efficient in operation.

Another object of this invention is to provide such a valve structure which may be operated with a minimum of power.

Another object of this invention is to provide such a structure which has a minimum of parts.

Another object of this invention is to provide such a structure in which the parts may be easily removed for repair, replacement or inspection.

Another object of this invention is to provide such a valve structure which has a minimum of fluid seals between moving parts.

Another object of this invention is to provide such a structure in which the pressure of the exhausting fluid is used at least in part to move the valve member to close the valve port.

Another object of this invention is to provide a subassembly in which the movable valve member and the body containing the valve port may be removed as a unit.

Another object of this invention is to provide such a valve and valve body assembly which may be used in multiple to provide valves having a greater number of valve ports.

Other objects of this invention will be apparent from the specification, the appended claims and the drawings which are to be considered as a part of this disclosure.

In the drawings,

Figure 1 is a vertical sectional view taken substantially along the center line of a valve embodying the invention;

Fig. 2 is a view taken substantially along the line 2—2 of Fig. 1;

Fig. 3 is a view similar to Fig. 1 but showing a modified form of the invention;

Fig. 4 is a view taken substantially along the line 4—4 of Fig. 3;

Fig. 5 is a view taken substantially along the line 5—5 of Fig. 3;

Fig. 6 is a view taken substantially along the line 6—6 of Fig. 3;

Fig. 7 is a view taken substantially along the line 7—7 of Fig. 4;

Fig. 8 is a view taken substantially along the line 8—8 of Fig. 3; and

Fig. 9 is an enlarged view of one of the ported members.

Referring to the drawings, the numeral 1 designates generally a solenoid actuated air valve having a casing or body member 2, a port carrying structure 4 positioned within the body member 2, a valve member 6 and actuating means which herein is shown as an electric solenoid 8 operable to actuate the valve member 6.

The valve body or casing comprises generally a cylindrical portion 10 having an inlet connection 12 adapted to be connected to a source of compressed fluid, a pair of exhaust outlets 14, and a control outlet 16 adapted to be connected to the fluid system controlled by the valve 1. The valve body 2 has a longitudinally extending cylindrical aperture 18 extending concentrically with the cylindrical portion 10 and opening outwardly through its upper end 20 and through its lower end 22. The inlet 12 opens through passageway 23 into the upper portion of the cylindrical central aperture 18 above the structure 4. If desired, the cylindrical chamber 18 may be provided with an annular recess 24 whereby the fluid supplied by the inlet 12 is distributed about the adjacent periphery of the aperture 18.

The port carrying structure 4 is preferably a hollow cylindrical member, the outer periphery 25 of which has a close fit with the wall of the chamber or aperture 18. The structure 4 has a plurality of radially extending apertures 26 which are located substantially midway between its upper end 28 and its lower end 30 and are in open communication with an annular recess 32 of the cylindrical aperture 18, and with the control outlet 16 through passageway 34. If desired, the port carrying structure may be provided with a peripheral groove 36 which registers with the annular recess 32. To prevent fluid flow along the wall of the chamber 18 outwardly of the recess 32, the structure 4 is provided with upper and lower annular recesses 40 and 42 which receive O-type sealing rings 44. The upper and lower ends of the port carrying structure 4 are provided with counterbore portions 48 and 50, respectively, in which are received O-type rings 52 and 54 which act as valve seats and define the valve controlled ports of the structure 4. The rings 52 and 54 are held in place by annular members 55.

The members 55 are positioned by ported cylindrical members 56 and 58 located within the cylindrical aperture 18 above and below the port carrying structure 4, respectively. Each of the members 56 and 58 are peripherally apertured as at 57 to provide ports adjacent their end portions facing the port carrying structure 4 and are provided with a counterbored portion 59 which receives the members 55. The peripheral apertures of the members 56 and 58 preferably extend radially of the members and obliquely to the longitudinal axis thereof so as to afford relatively unrestricted flow passageways between the adjacent valve ports and the adjacent respective recesses 24 or 66. The annular recess 66 is in communication with the exhaust outlets 14 by means of radially extending passageways 67.

The valve member 6 comprises generally two spaced, rigidly connected valve portions 70 and 72 having conical seating surfaces 74 and 76 cooperable respectively with the rings 52 and 54 to control fluid flow therethrough. The valve portions 70 and 72 are each provided with a central longitudinally extending aperture 78 which receive a through bolt 80, having a head engaging the upper surface of the valve portion 70 and a nut 81 engaging the lower surface of the valve portion 72. In order that the valve portions 70 and 72 will be positioned in fixed position relative to each other, a cylindrical sleeve 82 is positioned on the bolt 80 intermediate the portions 70 and 72 so that its ends will abut these valve portions and hold them in their desired spaced positions in which only one of the surfaces 74 or 76 is engageable with its respective O-ring or port at one time.

Each of the valve portions 70 and 72 is of identical construction and comprises the aforesaid conical seating surface and a cylindrical portion 84 which has a sliding fit with the central aperture of the respective members 56 and 58. The cylindrical portions 84 are each provided with an annular recess 86 which receive O-type sealing rings 88 which act to prevent flow of fluid along the cylindrical portions 84. The O-ring 88 associated with the valve portion 72 may be omitted if desired since the annular recess 66 is connected to atmosphere through the ports 14 and is therefore substantially at atmospheric pressure throughout most of the operating period of valve 1.

The upper end 20 of the casing 2 is closed by means of a cap 90 secured to the casing 2 as by means of cap screws 92. The cap 90 has an L-shaped passageway 94 opening through a port 96 into a chamber 98 in the upper end of the member 56 above the valve portion 70 whereby pressure in the chamber 98 acts to urge the valve member 6 to its downward position. The passageway 94 opens into a vertical passageway 100 within the body member portion 10 which extends longitudinally thereof with its lower end portion opening into the annular recess 66. Normally atmospheric pressure is maintained in the recess 66 due to its open communication with the surrounding atmosphere through the exhaust outlets 14. The outlets 14 are however of limited flow area and during at least a portion of the period in which the valve is exhausting the pressure in the chamber or recess 66 will be elevated and such increase in pressure will be transmitted through the passageways 100 and 94 to increase the pressure in the chamber 98 to aid in the closing of the inlet valve port formed by the ring 48. The valve 6 is also normally biased to its inlet port closed position by a helical coil spring 102 located in the chamber 98 and seating at one end against the upper surface of the valve portion 70 and at its other or upper end against the cap 92.

The valve 6 is moved to its upper position by a solenoid 8 contained within a casing 104 carried by the casing 2 at its lower end 22. The casing comprises an L-shaped member 105 and a complemental casing portion 106. The base of the member 105 is suitably held to the lower end wall 22 of the body member 2 and is located in proper position with respect thereto by an outwardly extending boss 107 which closely fits the aperture 18 and which also engages the lower end portion of the member 58 whereby it is positioned longitudinally within the aperture 18. The base of the member 105 is provided with a through aperture 108 arranged concentrically with the boss 107. A spring plunger 110 is guided for reciprocal movement in the aperture 108 and comprises a cup-shaped housing 112 having its open end opening upwardly toward the valve member 6. A helical spring 114 is positioned within the housing 112 and seats at one end against the bottom of the housing and at its other end against a plunger 116. Outward movement of the plunger 116 is limited by its engagement with a snap ring 118 held within a peripheral groove in the housing 112 adjacent its open end. The lower end of the housing is connected as by means of a pin 120 to the armature 122 of the solenoid 8. Upon energization of the solenoid 8 its armature 122 moves upwardly thereby bringing the plunger 116 into engagement with the lower end of the bolt 80 and moves the valve member 6 upwardly to open the inlet port and close the exhaust port of the valve. Compression of the spring 114 permits the solenoid 8 to have a longer stroke than the valve member 6 and also eliminates hum.

In operation the inlet connection 12 is connected with a suitable source of fluid under pressure. The controlled outlet 16 is connected to a fluid circuit, the pressure wherein is to be controlled such as a fluid operated ram and the exhaust outlets 14 are open to atmosphere and open outwardly of the casing 2; the ports or outlets 14 being protected by means of cap 124 secured to the casing 2 as by means of screws 126. It is to be understood that the upper portions of the cap 124 are closed and the lower portions of the cap 124 are open for the passage of air to atmosphere from the exhaust outlets 14.

Normally the spring 102 holds the valve member 6 in the position shown in Fig. 1 of the drawing so that the inlet fluid under pressure is held against passage outwardly of the annular chamber 24 by means of the O-ring 88 and by the engagement of the valve portion 70 with the inlet port 52. Any fluid that should escape past the O-ring 88 for any reason will flow into the chamber 98 and outwardly through the passages 94 and 100 to the exhaust outlets 14, whereby the pressure in the chamber 98 will be maintained substantially at atmospheric pressure except during the above recited period in which the valve 1 is exhausting the controlled outlet 16. The valve seat 54 is also opened to the exhaust outlets 14 through the annular recess 66.

The diameter of the valve seat ring 52 is only slightly larger than that of the cylindrical portion 84 of the valve portion 70 so that with the valve member 6 in the shown or inlet closed position the pressure forces acting on the member 6 are nearly balanced. The slight unbalance in the pressure exerted force is that due to the annulus bounded on the inside by the outer surface of the valve cylindrical portion 84 and on the outside by the line of engagement of the conical portion 74 with the seat ring 52. Since the area of this annulus is relatively small the effect of the inlet fluid pressure is small and the force which must be exerted by the solenoid 8 to open the valve is likewise small and the valve 1 requires a small amount of electrical energy to be moved to open position.

Likewise when the valve portion 72 is in engagement with the seat ring 54 the only unbalance in pressure forces acting to close the inlet port and open the outlet port is that acting on a relatively small area annulus having its inner periphery bounded by the outer diameter of the cylindrical portion 84 of the valve portion 72 and its outer periphery bounded by the line of engagement of the conical portion 76 with the seat ring 54 which produces substantially the same resultant force tending to close the valve inlet port and open the exhaust port as was present tending to hold the inlet valve port closed so that the solenoid 8 is opposed by a substantially equal force in opening the valve and in maintaining the valve open.

Upon de-energization of the solenoid 8, the slight unbalanced closing force exerted by the pressure against the valve portion 72 will cause the valve member 6 to move downwardly closing the inlet port 52 and opening the outlet port 54. As soon as the outlet port 54 opens, the exhausting fluid will flow inwardly from the ram or other associated mechanism through the control outlet 16, the passageway 34 and through the valve outlet port 54 into the annular recess 66. Since the flow through the outlets 14 is somewhat restricted there will be a transitory build-up of pressure in the recess 66 which will be transmitted through the passageways 100 and 94 to the chamber 98. The pressure in the chamber 98 is transitorily increased and acts on the valve member 6 to cause a quick and complete closing of the inlet port 52 and complete opening of the outlet port 54. This transitory increase in pressure in the recess 66 also causes a flow of fluid through passageways 130 into the casing 104 to help ventilate and cool the solenoid 8.

In Figs. 3 through 7 there is shown a modified form of this valve in which like parts are designated by the same numerals as are the parts in Figs. 1 and 2 with the suffix L or R added as required to designate the left-hand or right-hand duplicated parts as shown in Fig. 3. The valve 1a comprises a casing 2a provided with a pair of cylindrical apertures 18L and 18R, valve members 6L and 6R, cylindrical members 56L and R and 58 L and R, and port structures 4L and 4R. A single solenoid 8 is provided for actuating the valve member 6R, the valve member 6L being actuated as a consequence of the actuation of the valve member 6R. The recesses 24L and 24R may be interconnected by means of an internally threaded drilled passageway 150 and supplied from a common fluid pressure source through inlet 12R. In such event inlet 12L is closed by suitable means such as a closure plug (not shown) threadedly received in the inlet 12L. As shown the passageway 150 is closed by a screw threaded removable plug 152 so that the valve 1a is arranged to have its recesses 24L and 24R supplied independently. With such an arrangement, the fluid may be maintained at different pressures in each of the recesses 24L and 24R from either a common source through pressure controlling valve (not shown) or from independent sources (not shown). The inlet 12R is preferably of sufficient diameter to permit the insertion of and removal of the plug 152 and if desired may be provided with a reducing bushing 154 to bring the inlet size down to the desired size.

The recess 32R is provided with an enlargement 156 connected by means of a passageway 158 which may be a drilled hole drilled inwardly from the end wall 20a of the casing 2a. The lower open end of this passageway 158 registers with one end of a passageway 160 which may be cast in the cap 90a and which opens into the lower end of the chamber 18L. It will thus be evident that when fluid under pressure is being supplied by the valve 6R to its controlled outlet 16R that pressure will also be supplied through passageways 158 and 160 to the lower end 160a of the chamber 18L wherein it will act on the lower end surface of the valve member 6L to close the inlet port 52L and open the exhaust port 54L.

The recesses 66R and 66L may be made to open into each other and in constant open communication with both the outlets 14, however it is preferred to have them separated from each other as shown, such separation being effected by the wall 161. In this instance the recesses 66R and 66L are open to the outlets 14a and 14b respectively. A passageway 100a is provided in the casing 2a which extends from the recess 66R through the casing 2a and outwardly of the wall 20a and in open communication with a passageway 162 which may be cast in the cap 90a and which in turn opens into chamber 98R so that a transitory increase in pressure in the recesses 66R will cause a transitory increase in pressure in chamber 98R for aiding in the movement of the valve member 6R to close port 52R and open port 54R substantially as described in connection with valve 1. A passageway 163 connects the chamber 98L with the recess 66R. Preferably the passageway 163 opens into the recess 66R at a point wherein the transitory increase in pressure therein is of the greatest magnitude for a purpose which will subsequently be made clear.

As shown the valve 1a is provided with a pair of fluid pressure inlets 12L and 12R and a communicating passageway 150 whereby the valve 1a may be supplied from a single or multiple source of fluid through the side wall of the casing 2a. The casing 2a is further provided with a pair of controlled outlets 16L and 16R also opening through the casing side wall. In commercial use in the interest of conserving space it is often desired to bring in the fluid conduits from beneath the valve. The valve 1a has therefore been provided with inlets 12Ra and 12La and controlled outlets 16Ra and 16La which open downwardly through the cap 90a. These inlets 12Ra and outlets 16Ra communicate with the recesses 24R and 32R respectively through passageways 164 and 166 which extend through the cap 90a and within the casing 2a. The inlet 12La and outlet 16La are similarly communicatively connected with the recesses 24L and 32L by passageways 168 and 170. It will be apparent that the outlets 16Ra, 16La, 16R and 16L and the inlets 12Ra, 12La, 12R and 12L which are not used will be closed by suitable plugs (not shown).

The valve 1a operates much the same as the valve 1 as far as the valve member 6R is concerned. The valve member 6L is actuated as a consequence of the actuation of the valve member 6R. When the solenoid 8 is de-energized the valve member 6R will be held in a position in which the port 52R is closed and the port 54R is open. The recess 32R will be at atmospheric pressure so that the pressure under the lower end of the valve member 6L will be at atmospheric pressure. Under these conditions the spring 102L will act to hold the valve member 6L in its downward position in which the port 52L is open and 54L is closed whereby fluid under pressure is supplied by the controlled outlet 16L. Upon energization of the solenoid, the valve member 6R is moved downwardly to open the port 52R and close the port 54R whereby fluid under pressure is supplied to the controlled outlet 16R. This increase in pressure at the outlet 16R and recess 32R is transmitted through the passageways 158 and 160 to the lower end of the valve members 6L and acts to move this member 6L upwardly against the force of the spring 102L whereby the port 52L is closed and the port 54L is opened to exhaust the pressure at the controlled outlet 16L.

When the valve as shown in Figs. 3–7 is utilized with pressure apparatus or rams having a large cubical capacity, the transitory increase in pressure in the recesses 66R and 32R associated with the valve member 6R is of substantial duration and would tend to delay the operation of the valve member 6L in its controlling function. A passageway 163 connects the chamber 98L with the recess 66R whereby the pressure in the chamber and the portion of the recess 66R adjacent the passageway 163 will be substantially equal. Since the pressure in chamber 98L is that of the portion of the recess 66R with which it is associated and the pressure in the lower end 160a is that within the recess 32R it will be evident that the differential in fluid pressure acting on the opposite ends of the valve member 6L will be the pressure drop across the valve seat 54R. Under operating conditions in which the valve member 6R is supplying pressure fluid this differential in pressure will be great and the valve member 6L will be moved to its exhausting or upward position. Under exhausting conditions of the valve member 6R the differential in pressure across the seat 54R will be very small and the spring in the chamber 98L can move the valve member 6L to its lower or pressure supplying position substantially immediately upon movement of the valve member 6R to exhaust position irrespective of the fact that the transitory increases in pressures in the recesses 32R and 66R have not subsided. In fluid circuits in which the cubical volume or capacity of the ram or other controlled apparatus is small and the transitory pressure increase in recess 32R is short in duration the passageway 163 could be made to open directly to atmosphere to vent the chamber 98L.

It will now be evident that the valve 1a is fabricated for the most part from the same parts as valve 1 with a casing utilizing two valve chambers and a duplication of the valve members and port members and that a single actuator operable with a minimum of power is effective to actuate both valve members. It will further be apparent that in the same manner additional controlled outlets can be provided by the expedient of adding further valve members substantially as described in connection with valve 1a in which event either of the recesses 32L or 32R would be used as the source of actuating energy depending upon whether the added valve member was to be operated with or oppositely to the valve member 6L.

What is claimed and is desired to be secured by United States Letters Patent is:

1. In a valve structure, a casing having opposite end walls, a passageway extending through said casing and opening outwardly of said walls, a ported member within said passageway and having oppositely disposed valve seats defining inlet and exhaust valve ports, said member having a fluid flow port disposed intermediate and in fluid flow communication with said inlet and said exhaust ports, a pair of spaced opposed valve members rigidly connected together and spaced to permit solely one of said valve members to engage its respective said seat at one time, said casing being provided with an inlet passageway adapted to be connected with a source of fluid under pressure and in open communication with said inlet port, said casing being provided with an exhaust passageway of restricted flow area, and means providing a passageway communicatively connecting said exhaust port and an end wall of one of said valve members whereby an increase in pressure in said last-named passageway acts to urge said valve members into a position to close said inlet port and open said exhaust port.

2. In a valve structure, a casing having a passageway opening outwardly through a wall thereof, a first and a second and a third tubular member snugly fitting within said passageway in end-to-end abutting relation with respect to each other, said members being provided with aligned apertures, said second member being located intermediate said first and said third members, means providing valve seats at opposite end portions of said second member, a first valve member cooperable with one of said seats for controlling flow of fluid therethrough and having a portion guided within said first tubular member, a second valve member cooperable with the other of said seats for controlling flow of fluid therethrough and having a piston portion guided within said aligned aperture of said third tubular member, an actuator for said valve members, a housing enclosing said actuator, and means providing a passageway interconnecting the interior of said actuator housing with said third member aperture on the side of said second valve member piston portion away from the portion which controls fluid flow through said other valve seat whereby movement of said second valve member causes a breathing action in said actuator housing for flow of fluid around said actuator.

3. In a valve structure, a casing having a passageway opening outwardly through a wall thereof, a first and a second and a third tubular member snugly fitting within said passageway in end-to-end relation with respect to each other, said members being provided with aligned apertures, said second member being located intermediate said first and said third members, means providing valve seats at opposite end portions of said second member, a first valve member cooperable with one of said seats for controlling flow of fluid therethrough and having a pistonlike portion extending within the interior said first tubular member and having a pistonlike fit therein, a second valve member cooperable with the other of said seats for controlling flow of fluid therethrough and guided within said third tubular member, and means providing a passageway communicating with the interior of said first member behind said pistonlike portion whereby fluid may be supplied for moving said first valve member.

4. In a valve structure, a casing having a passageway opening outwardly through a wall thereof, a first and a second tubular guide member snugly fitting within said passageway in end-to-end relation with respect to each other, a tubular port member snugly fitting within said passageway and positioned intermediate said guide members, said members being provided with aligned apertures of substantially equal diameter, means providing valve seats at opposite end portions of said port member, said seats being of slightly greater diameter than said apertures, a first valve member cooperable with one of said seats for controlling flow of fluid therethrough and having a pistonlike portion extending within said first guide member aperture and having a pistonlike fit therein, a second valve member cooperable with the other of said seats for controlling flow of fluid therethrough and having a pistonlike portion extending within said second guide member aperture and having a pistonlike fit therein, means extending through said port member aperture for rigidly connecting and fixedly spacing said valve members with respect to each other, said spacing being such that solely one valve member can engage its respective seat at one time, means providing a main inlet passageway externally of said port member to one of said seats for supplying fluid under pressure thereto, means providing a main exhaust passageway externally of said port member from the other of said seats, means providing a controlled fluid passageway opening into said port member aperture intermediate said seats, and means providing a passageway for communicatively connecting one of said main passageways with the aperture of one of said guide members behind the one of said pistonlike portions having a pistonlike fit therewith.

5. A valve structure comprising a casing having a cylindrical passageway opening outwardly thereof through one wall thereof, a first hollow cylindrical member positioned within said passageway, said member being provided adjacent one end portion with a counterbore, said one end portion being provided with a passageway opening externally of said member and opening into said counterbore, said casing being provided with a fluid flow passageway in open communication with said member passageway, a second hollow cylindrical member positioned within said casing cylindrical passageway adjacent said first member one end portion, said second member being provided with a valve seat at either end thereof and provided intermediate said seats with a passageway opening outwardly of the hollow interior thereof through its peripheral wall, said casing being provided with a fluid flow passageway in open communication with said second member passageway, a third hollow cylindrical member positioned within said casing cylindrical passageway, said third member being provided adjacent one end portion with a counterbore, said third member one end portion being adjacent said second member, said third member one end portion being provided with a passageway in opening externally of said third member and opening into said third member counterbore, said casing being provided with a fluid flow passageway in open communication with said third member passageway, a first valve member having a port seating surface cooperable with one of said valve seats for control of fluid flow therethrough, and having a cylindrical portion guided within the hollow interior of said first member rearwardly of said first member counterbore and a second valve member having a port seating surface cooperable with the other of said valve seats for control of fluid flow therethrough.

6. The combination of claim 5 in which said valve members are rigidly connected and fixedly spaced with respect to each other by a connecting member extending through said second hollow member.

7. The combination of claim 6 in which said second valve member is provided with a cylindrical portion guided within the hollow interior of said third hollow member rearwardly of its counterbore and in which both of said valve member cylindrical portions are of equal diameter.

8. The combination of claim 7 in which said casing is provided with a passageway opening into the hollow interior of said first hollow member toward said first hollow member end portion opposite to its said one end portion and opening into said casing cylindrical passageway adjacent said third hollow member passageway.

9. In a valve structure, a casing having a pair of elongated passageways, a hollow port member positioned in each of said passageways, each said port member having valve ports at opposite ends thereof opening into the hollow interior thereof, a valve means for each said port member and cooperable with its respective port member to control flow of fluid through said respective valve member valve ports, one of said valve means being provided with an extending pistonlike portion, means providing a cylinderlike chamber portion for receiving said pistonlike portion and cooperable therewith to provide a fluid pressure chamber, said casing being provided with fluid flow passageways, one of said fluid flow passageways communicating with the hollow interior of the one of said port members which is associated with the other of said valve means, the other of said fluid flow passageways communicating with the hollow interior of the other of said port members, means for controlling the one of said valve means which is cooperable with said one port member whereby it is actuated to selectively control fluid flow through said one port member valve ports, and means providing a fluid flow passageway interconnecting said one passageway with said pressure chamber whereby pressure admitted to said one passageway by said other valve means will act on said one valve means piston-like portion to urge said one valve means in one direction.

10. In a valve structure, a casing having a pair of elongated passageways, a hollow port member positioned in each of said passageways, each said port member having valve ports at opposite ends thereof opening into the hollow interior thereof, a valve means for each said port member and cooperable with its respective port member to control flow of fluid through said respective valve member valve ports, each said valve means being provided with an extending pistonlike portion, means providing cylinderlike portions for receiving said pistonlike portions and cooperable therewith to provide fluid pressure chambers, said casing being provided with fluid flow passageways, one of said fluid flow passageways communicating with the hollow interior of one of said port members, the other of said fluid flow passageways communicating with one of said ports of said one port member externally thereof, means for controlling the one of said valve means which is cooperable with said one port member whereby it is actuated to selectively control fluid flow through said one port member valve ports, means providing a fluid flow passageway from said one fluid flow passageway to the one of said chambers associated with the other of said valve means which is associated with said other port member, and means providing a fluid flow passageway from said other fluid flow passageway to the other of said chambers.

11. In a valve structure, a casing having a pair of elongated passageways, a hollow port member positioned in each of said passageways, each said port member having valve ports at opposite ends thereof opening into the hollow interior thereof, a valve means for each said port member and cooperable with its respective port member to control flow of fluid through said respective valve member valve ports, one of said valve means being provided with an extending pistonlike portion, means providing a cylinderlike portion for receiving said pistonlike portion and cooperable therewith to provide a fluid chamber, said casing being provided with fluid flow passageways, one of said fluid flow passageways communicating with the hollow interior of the one of said port members associated with said one valve means, the other of said fluid flow passageways communicating with the others of said ports of the one of said port members associated with the other of said valve means, means for controlling said other valve means whereby it is actuated to selectively control fluid flow through said other port member valve ports, and means providing a fluid flow passageway interconnecting said other passageway with said pressure chamber.

12. In a valve structure, a casing having a pair of elongated passageways, each said passageway being provided with a pair of spaced valve ports intermediate its ends, a valve member within each said passageway, each said valve member having spaced surfaces cooperable respectively with said valve ports, the surfaces of each said valve member being spaced from each other a distance relative to the spacing of said ports so that when one of said ports of said pair of ports is closed by one said valve member surface the other said port of said pair of ports is spaced from the other of said valve member surface to permit fluid flow, a pair of fluid pressure sensitive elements operatively associated with one of said valve members for controlling the movement thereof as a function of the difference in fluid pressure in said fluid pressure sensitive elements, said one valve member being associated with one of said elongated passageways, means providing a fluid flow passageway interconnecting the other of said elongated passageways intermediate its said spaced ports with one of said fluid pressure sensitive elements, and means providing a fluid flow passageway interconnecting said other elongated passageway intermediate one end thereof and one of its associated said valve ports with the other of said fluid pressure sensitive elements.

13. In a valve structure, a casing having a pair of elongated passageways, each said passageway being provided with a pair of spaced valve ports intermediate its ends, a valve member within each said passageway, each said valve member having spaced surfaces cooperable respectively with said valve ports, the surfaces of each said valve member being spaced from each other a distance relative to the spacing of the said ports with which it is associated so that when one of said ports of said pair of ports is closed by one said valve member surface the other said port of said pair of ports is spaced from the other of said valve member surface to permit fluid flow, one of said valve members being provided with fluid pressure sensitive end portions, said one valve member being associated with one of said elongated passageways, means providing a fluid flow passageway for supplying fluid from the other of said elongated passageways intermediate its said spaced ports to one of said fluid pressure sensitive end portions, and means providing a fluid flow passageway for supplying fluid from said other elongated passageway intermediate one end thereof and one of its associated said valve ports to the other of said fluid pressure sensitive end portions.

14. In a valve structure, a casing having a pair of elongated passageways, each said passageway being provided with a pair of spaced valve ports intermediate its ends, a valve member within each said passageway, each said valve member having spaced surfaces cooperable respectively with said valve ports, the surfaces of each said valve member being spaced from each other a distance relative to the spacing of the said ports with which it is associated so that when one of said ports of said pair of ports is closed by one said valve member surface the other said port of said pair of ports is spaced from the other of said valve member surface to permit fluid flow, one of said valve members being provided with fluid pressure sensitive end portions, said one valve member being associated with one of said elongated passageways, means providing a fluid flow passageway for supplying fluid from the other of said elongated passageways intermediate its said spaced ports to one of said fluid pressure sensitive end portions, means providing a fluid flow passageway for supplying fluid from said other elongated passageway intermediate one end thereof and one of its associated said valve ports to the other of said fluid pressure sensitive end portions, passageway means adapted to supply pressure fluid to said other elongated passageway intermediate the other of its spaced ports and the other of said other passageway, passageway means communicating with said other elongated passageway intermediate its said spaced ports and operable to be connected to an apparatus for controlling the fluid pressure therein, and passageway means of controlled fluid flow capacity for exhausting fluid from said other elongated passageway intermediate its said one end portion and its said one valve port.

15. In a valve structure, a body member having a pair of passageways therethrough, each said passageway being provided with a valve port, a valve member associated with each said port controlling fluid flow through said passageways, a pair of fluid pressure sensitive means associated with one of said valve members and operable upon increase in fluid pressure therein to urge said one valve member in opposite directions, said one valve member being associated with the valve port associated with one of said pair of passageways, and means providing fluid flow passageways, one of said last-named passageways communicatively interconnecting one of said pair of fluid pressure sensitive means with the other of said pair of passageways, the other of said last-named passageways communicatively interconnecting the other of said pair of fluid pressure sensitive means with said other of said pair of passageways on the opposite side of the said valve port which is associated with said other of said pair of passageways from the communication of said one last-named passageway with said other of said pair of passageways.

16. In a valve structure, a casing having a valve chamber opening outwardly of one end thereof, a valve port carrying structure insertable into said valve chamber through said one end, said port structure comprising a hollow open ended member having a valve port at each end thereof and positioned within said valve chamber to prevent fluid flow along the walls of said valve chamber past said port structure, said casing having a fluid pressure inlet passageway opening into said valve chamber outwardly of one end of said port structure, said casing having a venting passageway opening into said valve chamber outwardly of the other end of said port structure, said casing having a controlled fluid flow passageway opening into the hollow interior of said port structure, a valve structure extending through said port structure and having a first valve port closing portion cooperable with one of said port structure valve ports to control fluid flow therethrough and a second valve port closing portion cooperable with the other of said port structure valve ports to control fluid flow therethrough, said valve port closing portions being relatively spaced to close solely one of said valve ports at one time, a pressure responsive chamber separate from said inlet and said controlled passageways and including a pressure sensitive movable wall, said movable wall being movable in response to changes in pressure in said chamber and operatively associated with said valve structure for urging said valve structure in a direction to close said one port, and means providing a passageway leading from said exhaust passageway to said pressure chamber.

17. In a valve structure, a casing having opposite end walls and a passageway essentially of constant cross section extending completely therethrough and opening outwardly through both of said end walls, said casing being provided with an opening opening into said passageway intermediate said end walls, a pair of locating members insertable into and removable from said passageway through either of said end walls, a valve port structure insertable into and removable from said passageway through either of said end walls, said port structure being located intermediate said locating members and including a member provided with oppositely facing valve ports interconnected by a passageway and having an opening intermediate said ports communicatively connecting said member passageway with the exterior of said structure, said structure being positionable within said casing passageway intermediate said end walls and with said member opening communicating with said casing opening by said locating members, and valve means carried by said structure and cooperable with said ports to control fluid flow therethrough and having portions of greater dimension than the dimension of said port structure passageway whereby removal of said valve means outwardly of either of said casing end walls will positively move said port structure and one of said locating members out of said casing.

18. In a valve structure, a casing having opposite end walls and a passageway essentially of constant cross section extending completely therethrough and opening outwardly through both of said end walls, means providing three longitudinally spaced openings into said passageway, a pair of locating members insertable into and removable from said passageway through either of said end walls, a valve port structure insertable into and removable from said passageway through either of said end walls, said port structure being located intermediate said locating members and including a hollow open ended member having opposite opening ports interconnected by its hollow interior and having an opening intermediate said ports opening outwardly thereof, said structure being positionable within said casing passageway intermediate the furthest spaced of ones of said casing openings with said member opening in fluid flow communication with the intermediate one of said casing openings by said locating members, said locating members being provided with ports communicatively connecting said furthest spaced casing openings with said port structure oppositely opening ports, and valve means carried by said structure and cooperable with said ports to control fluid flow therethrough and having portions of greater dimension than the dimension of said port structure passageway whereby removal of said valve means outwardly of either of said casing end walls will positively move said port structure and one of said locating members out of said casing.

19. In a valve structure, a casing having a chamber, provided with oppositely facing valve seats, a pair of spaced opposed valve members cooperable with said seats to control flow of fluid therethrough, said members being spaced to permit solely one of said members to engage its respective said seat at one time, said casing being provided with passageways communicating with said seats, one of said passageways being provided with means separate from said valve members and said valve seats to restrict flow of fluid therethrough as a consequence of fluid flow through one of said valve seats, and means including a fluid flow passageway communicating with said one passageway intermediate said flow restricting means and the said one seat for applying a force to one of said valve members as a consequence of the pressure drop across said restricting means.

20. In a valve structure, a casing having an internal passageway, a ported member within said passageway and having oppositely disposed valve seats defining inlet and exhaust valve ports, said member having a fluid flow port disposed intermediate and in fluid flow communication with said inlet and said exhaust ports, a pair of spaced opposed valve members rigidly connected together and spaced to permit solely one of said valve members to engage its respective said seat at one time, said casing being provided with an inlet passageway adapted to be connected with a source of fluid under pressure and in open communication with said inlet port, said casing being provided with an exhaust passageway of restricted flow area, and means providing a passageway communicatively connecting said exhaust port and an end wall of one of said valve members whereby an increase in pressure in said last-named passageway acts to urge said valve members into a position to close said inlet port and open said exhaust port.

21. In a valve structure, a casing having an end wall and a passageway opening outwardly through said wall, a ported member within said passageway and having an end wall, said member end wall having an annular recess, a resilient annular member positioned in said recess and forming a valve seat, a valve member cooperable with said seat to control flow of fluid therethrough, a positioning member having an end portion facing said ported member, said positioning member end portion being serrated to provide a plurality of passageways opening to said seat, an annular ring seating against the ends of said positioning member serrations and against said resilient member to hold said resilient member in said recess, and means carried by said casing for positioning said positioning member in said casing.

22. The combination of claim 21 in which the ends of said serrations are provided with recessed shoulders for receiving said annular ring.

23. In a valve structure, a casing having opposite end walls, a passageway extending through said casing and opening outwardly of said walls, a ported member within said passageway and having oppositely disposed valve seats defining inlet and exhaust valve ports, said member having a fluid flow port disposed intermediate and in fluid flow communication with said inlet and said exhaust ports, a pair of spaced opposed valve members rigidly connected together and having portions of greater diameter than that of said ports, said casing being provided with an inlet passageway adapted to be connected with a source of fluid under pressure and in open communication with said inlet port, removable locating members positioned within said casing passageway and in abutting relation with said ported member for positioning said ported member, and removable members carried by said walls for positioning said locating members, said casing passageway being of constant dimension throughout its length so that said ported member and one of said locating members may be removed from said casing when said valve member is removed through either end wall.

FREDERICK H. JOHNSON.

References Cited in the file of this patent

UNITED STATES PATENTS

| Number | Name | Date |
|---|---|---|
| Re. 20,836 | Wall | Aug. 30, 1938 |
| 1,544,916 | Ludeman | July 7, 1925 |
| 1,704,759 | Miller | Mar. 12, 1929 |
| 1,779,319 | Jennings | Oct. 21, 1930 |
| 1,835,734 | Wanzenberg | Dec. 8, 1931 |
| 2,393,805 | Parker | Jan. 29, 1946 |
| 2,462,544 | Parker | Feb. 22, 1949 |